(12) United States Patent
Sugeno

(10) Patent No.: US 6,772,373 B2
(45) Date of Patent: Aug. 3, 2004

(54) DISORDER DETECTING DEVICE

(75) Inventor: Yoshikazu Sugeno, Fukushima-ken (JP)

(73) Assignee: Hitachi Telecom Technologies, Ltd., Fukushima-ken (JP)

(*) Notice: Subject to any disclaimer, the term of this patent is extended or adjusted under 35 U.S.C. 154(b) by 547 days.

(21) Appl. No.: 09/799,874

(22) Filed: Mar. 7, 2001

(65) Prior Publication Data
US 2001/0027542 A1 Oct. 4, 2001

(30) Foreign Application Priority Data

Mar. 23, 2000 (JP) ........................................ 2000-081333

(51) Int. Cl.⁷ ............................................... G06F 11/00
(52) U.S. Cl. ............................. 714/43; 714/37; 714/39; 714/703
(58) Field of Search ........................... 714/37, 39, 43, 714/703

(56) References Cited

U.S. PATENT DOCUMENTS 5,347,524 A * 9/1994 I'Anson et al. ............... 714/39

* cited by examiner

Primary Examiner—Nadeem Iqbal
Assistant Examiner—Christopher M Euripidou
(74) Attorney, Agent, or Firm—Foley & Lardner LLP

(57) ABSTRACT

A LAN connector 30 inserted between a high level equipment 11 and low level equipment 21, and incorporating only protocols for the first layer or up to the second layer for OSI to enable the transmission of communication data between the high level equipment and the low level equipment, comprises a ROM 65 to store disorder notification patterns correspondent with possible disorders, and a disorder notification control portion 51 which monitors an upside-originated idle signal from the high level equipment 11, or a downside-originated idle signal from low level equipment 21 using the protocol for the first layer; detects a disorder involving a component of the network as well as a disorder involving the LAN connector itself based on the monitoring result of the upside- or downside-originated idle signal; reads out from ROM a disorder notification pattern correspondent with the disorder thus detected; and transmits the pattern to the high level equipment 11 via an optical cable 70. Thus, this LAN system can detect a disorder involving a component of the network (disorder involving a communication route), by only using a physical layer or the fist layer.

8 Claims, 8 Drawing Sheets

DISORDER DETECTING DEVICE

CROSS-REFERENCES TO RELATED APPLICATION

This application claims all benefits accruing 35 U.S.C 119 from the Japanese Patent Application No. 2000-81333, filed on Mar. 23, 2000.

BACKGROUND OF THE INVENTION

1. Field of the Invention

The present invention relates to a disorder detecting device for detecting a disorder involving equipment connected to a network, by only resorting to a first physical layer out of the seven layers implemented as the standards of network protocol for open system interconnection (OST) which was introduced by ISO in order to ensure open type interconnection.

2. Description of the Related Art

In a conventional local area network (LAN), remote subnetworks are connected through a wide area network (WAN). However, because in recent years data are communicated through LANs at a high speed in wide areas, lines for data communication based on a WAN protocol come to be substituted for fiber optical cables based on a LAN protocol such as 100 Base-FX (LAN Standards IEEE802.3U) to enable direct communication between remote LANs.

FIG. 8 is a block diagram to illustrate the outline of such a conventional LAN network system.

This LAN network system 100 comprises a high level LAN-A110 containing a management equipment 111 to manage the network, and a high level equipment 112, and low level LAN-B120A and LAN-C120B each containing a plurality of user units 121. The LAN-A10, and LAN-B120A and LAN-C120B are communicably interconnected through routers 130 to serve as a connector. The direction of data traffic from the high level LAN-A10 to the low level LAN-B120A and LAN-C120B is taken as downward while the direction of data traffic from the low level LAN-B120A and LAN-C120B to the high level LAN-A110 as upward.

The router 130 is capable of photo/electric conversion of signals, and comprises high level routers 130A which communicably connect with LAN-A110 via electric cables 140A composed of a twist pair cable through which data are communicated on 10/100Base-TX, and low level routers 130B which communicably connect with LAN-B120A and LAN-C120B via electric cables 140B through which data are communicated on 10/100Base-TX.

The high level routers 130A and the low level routers 130B are communicably interconnected via fiber optical cables 150 through which data are communicated on 100Base-FX.

In the LAN network system 100 as configured above, the management equipment 111 in the higher level of network can switch off power to the components (high level router 130A, low level router 130B and user units 121) including user units 121 oppositely positioned in the lower level of network, or detect cable disorders possibly arising along communication routes in the downward direction containing the management equipment itself, by resorting to an echo command (so-called ping) as defined in the internet control message protocol (ICMP) applicable to the third layer out of the seven layers for OSI.

However, according to the conventional LAN network system 100, although it is possible for a personal computer (PC) with a communication function or a router 130 both provided with protocols applicable up to the third layer, to detect disorders in message cables by resorting to the echo command, it is impossible for a bridge, switch or repeater which serves as a mediator for the communication of data based on the second layer protocol and are provided only with protocols up to the second layer to detect disorders in message cables, despite that they are permitted to check electric or optical links through which data are communicated on the first layer protocol. This poses a problem.

In view of these problems, this invention has been proposed, and its object is to provide a device which will allow even equipment devoid of OSI protocols applicable to the third or higher layers to detect a disorder in a message cable by only resorting to a physical layer or the first layer.

BRIEF SUMMARY OF THE INVENTION

To attain the above object, the disorder detecting device of this invention arranged between high level equipment and low level equipment of a network, to transmit communication data between the high level equipment and the low level equipment, in order to serve as open systems interconnection (OSI), and to implement OSI protocols for the first layer or up to the second layer, comprises a monitoring means to monitor a upside-originated idle signal from the high level equipment or a downside-originated idle signal from the low level equipment using the protocol for the first layer; and a disorder detecting means to detect not only a disorder involving a component of the network but a disorder involving the disorder detecting device itself, based on the result obtained by the monitoring means as a result of monitoring the upside-originated signal or the downside-originated signal.

Thus, according to this invention, even if a LAN contains only protocols for the first layer or at maximum for the second layer for OSI, it can detect, provided that it incorporates a disorder detecting device of this invention, not only a disorder involving a component of its network but a disorder of the device itself, based on the monitoring result of an upside-originated idle signal or a downside-originated idle signal. Therefore, the LAN with the disorder detecting device of this invention can detect a disorder involving a component of its network (disorder involving a communication route), by using only its physical layer or the first layer.

The disorder detecting device of this invention comprises a fixed pattern memory means to store fixed patterns correspondent with disorders possibly involving the components of the network; and a disorder notifying means which reads out a fixed pattern correspondent with a disorder as detected by the disorder detecting means from the fixed pattern memory means, and transmits the fixed pattern to the high level equipment or to the low level equipment using the protocol for the first layer.

Thus, according to the disorder detecting device of this invention, fixed patterns are stored in advance in correspondence with disorders likely to happen; an appropriate fixed pattern is read out in correspondence with a disorder as detected by the disorder detecting means; and the fixed pattern is transmitted to high or low level equipment based on the first layer protocol. Thus, even if a LAN contains only protocols for the first layer or at maximum for the second layer for OSI, it can inform, provided that it incorporates a disorder detecting device of this invention, high or low level equipment of a disorder involving a component of the network (disorder involving a message route).

According to the disorder detecting device of this invention, the disorder notifying means transmits the fixed pattern using a communication line used for transmitting communication data between the high level equipment and the low level equipment.

Thus, even if a LAN contains only protocols for the first layer or at maximum for the second layer for OSI, it can inform, provided that it incorporates a disorder detecting device of this invention, high or low level equipment of a disorder involving a component of the network (disorder involving a message route), by only using a communication line used for the transmission of communication data between the high level equipment and the low level equipment, that is, by only using a physical layer or the first layer.

According to the disorder detecting device of this invention, the disorder notifying means transmits the fixed pattern, using a dedicated line different from the communication line used for transmitting communication data between the high level equipment and the low level equipment.

Thus, even if a LAN contains only protocols for the first layer or at maximum for the second layer for OSI, it can inform, provided that it incorporates a disorder detecting device of this invention, high or low level equipment of a disorder involving a component of the network (disorder involving a message route), by only using a dedicated line different from the communication line used for the transmission of communication data between the high level equipment and the low level equipment, that is, by only using a physical layer or the first layer.

According to the disorder detecting device of this invention, the disorder notifying means transmits the fixed pattern using light having the same wavelength with that of light passed through a communication cable for transmitting communication data between the high level equipment and the low level equipment.

Thus, even if a LAN contains only protocols for the first layer or at maximum for the second layer for OSI, it can inform, provided that it incorporates a disorder detecting device of this invention, high or low level equipment of a disorder involving a component of the network (disorder involving a message route), by only using light having the same wavelength with that of light used for the transmission of communication data between the high level equipment and the low level equipment, that is, by only using a physical layer or the first layer.

According to the disorder detecting device of this invention, the disorder notifying means transmits the fixed pattern using light having a wavelength different from that of light passed through a communication cable for transmitting communication data between the high level equipment and the low level equipment.

Thus, even if a LAN contains only protocols for the first layer or at maximum for the second layer for OSI, it can inform, provided that it incorporates a disorder detecting device of this invention, high or low level equipment of a disorder involving a component of the network (disorder involving a message route), by only using light having a wavelength different from that of light used for the transmission of communication data between the high level equipment and the low level equipment, that is, by only using a physical layer or the first layer.

According to the disorder detecting device of this invention, notification of a fixed pattern by the disorder notifying means to the high level equipment occurs in response to a notification request from the high level equipment.

Thus, because according to the disorder detecting device of this invention, a fixed pattern is transmitted to high level equipment in response to a notification request from the high level equipment, it is possible for the high level equipment to identify the nature of a disorder involving a component of the network (disorder involving a message route), based on the fixed pattern thus transmitted.

According to the disorder detecting device of this invention, notification of a fixed pattern by the disorder notifying means to the high level equipment occurs at specified time intervals.

Thus, according to the disorder detecting device of this invention, high level equipment can check at specified time intervals the happening of a disorder that may involve a component of the network (disorder involving a message route), and to identify the nature of the disorder.

BRIEF DESCRIPTION OF THE SEVERAL VIEWS OF THE DRAWINGS

FIG. 2(a) is a front view and FIG. 2(b) a rear view.

DETAILED DESCRIPTION OF THE INVENTION

Figure 1:
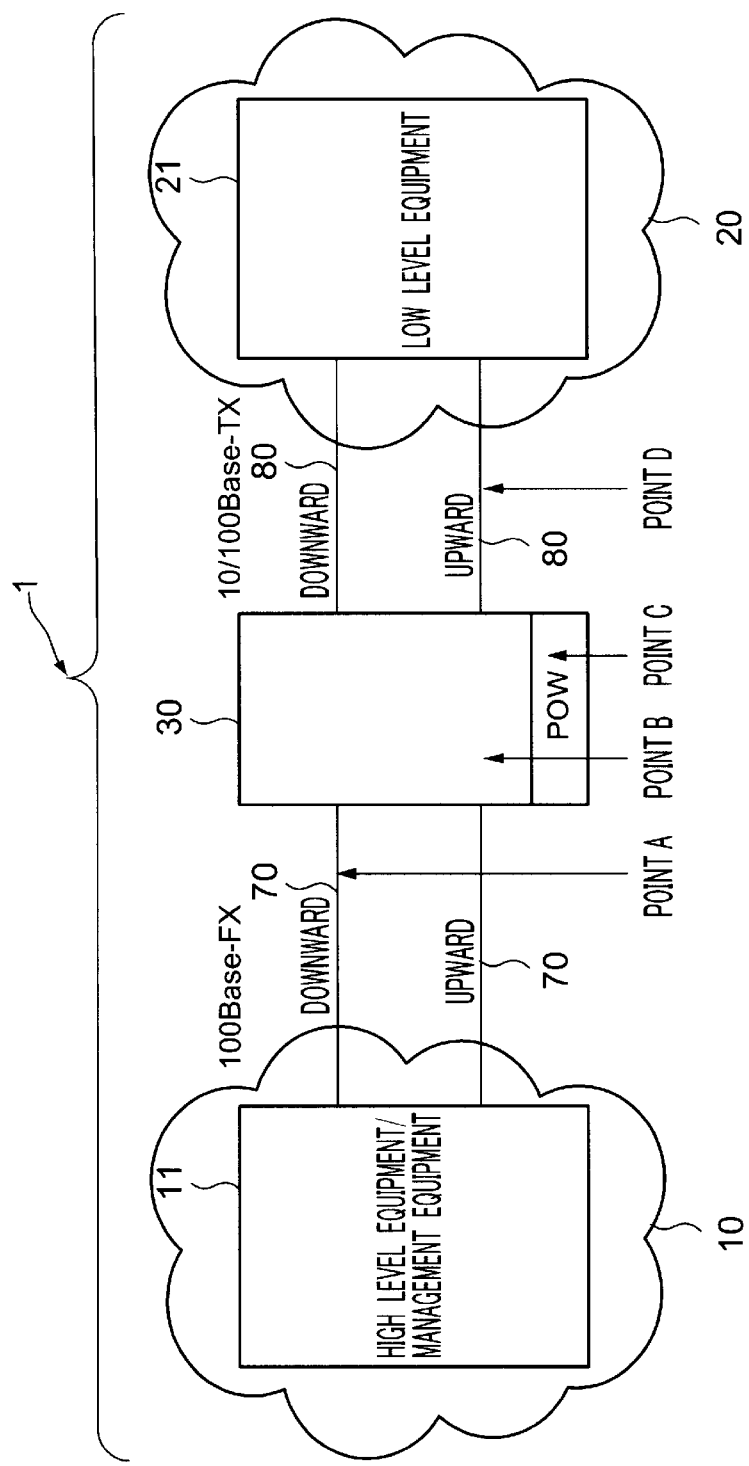
FIG. 1 is a block diagram for illustrating the simplified composition of a LAN network embodying a disorder detecting device of this invention.

A LAN network system incorporating a disorder detecting device of this invention representing an embodiment will be described below with reference to the attached drawings. FIG. 1 is a block diagram for illustrating the simplified composition of a LAN network incorporating a disorder detecting device representing an embodiment of this invention.

This LAN network system 1 comprises a network manager's LAN 10 consisting of a high level equipment 11 such as a management equipment to manage the network, and a user's LAN 20 consisting of a low level equipment 21 such as a plurality of user units. The network manager's LAN 10 and the network user's LAN 20 are communicably interconnected through a LAN connector 30 which is capable of detecting communication disorders by resorting to functions based on protocols up to the second layer. Incidentally, the direction of data traffic from the higher manager's LAN 10 to the lower user's LAN 20 is taken as downward while the direction of data traffic from the lower user's LAN 20 to the higher manager's LAN 10 as upward.

The LAN connector 30 may be compared to, for example, a bridge, switch or repeater that implements only protocols up to the second layer for OSI, is capable of photo/electric conversion of signals, and is communicably connected with the network manager's LAN 10 via fiber optical cables 70 through which data are communicated on 100Base-FX, while the LAN connector 30 is communicably connected with the network user's LAN 20 via twist pair electric cables 80 through which data are communicated on 10/100Base-Tx.

Figure 2:
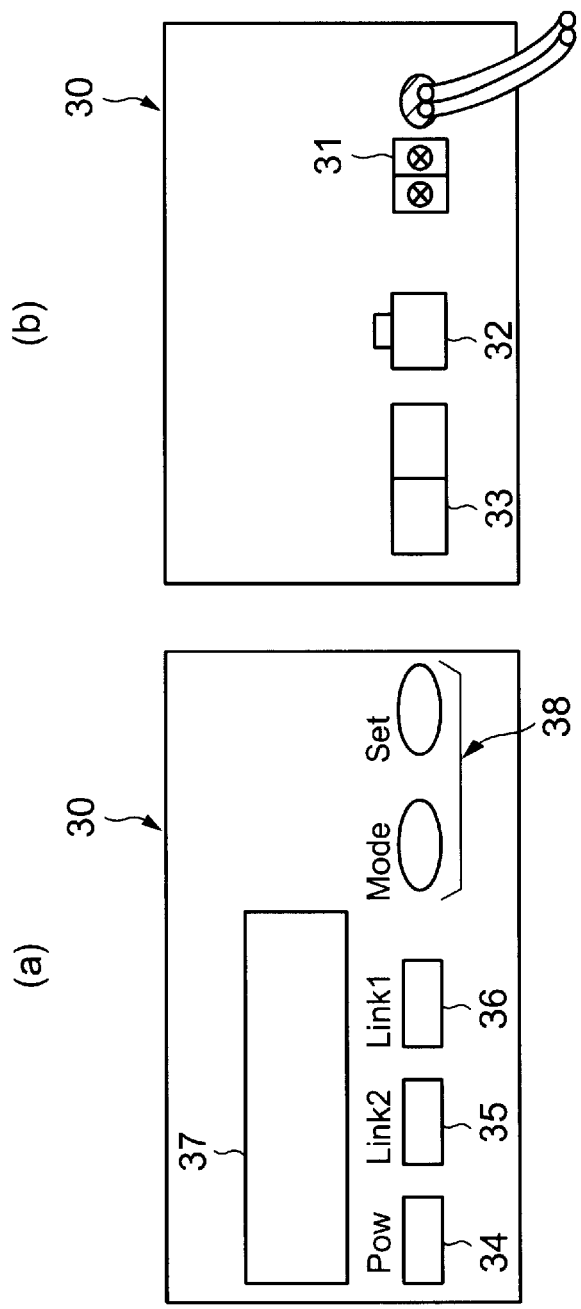
FIG. 2 shows the outlook of a LAN connector of the present embodiment.

FIG. 2 illustrates the outlook of the LAN connector 30: FIG. 2(a) is a frontal view and FIG. 2(b) a rear view.

The LAN connector as depicted in FIG. 2(b) comprises connection interfaces 31 to switch power supply from a commercial source to a failure proof source or vice versa; a connector 32 to serve as a LAN interface which communicably connects with fiber optical cables 70, and a connector 33 to serve as another LAN interface which communicably connects with electric cables 80.

The LAN connector 30 as depicted in FIG. 2(a) comprises an LED 34 to indicate the activation state of connector; another LED 35 to indicate the link state or communication state between the fiber optical cable 70 and the connector 32; a still other LED 36 to indicate the link state or communication state between the electric cable 80 and the connector 33; an LCD to display various kinds of information on its screen; and command keys 38 through which one can feed, as commands, various information necessary, for example, for setting an operation condition, checking for the presence of disorders, or maintaining the connector 30.

Figure 3:
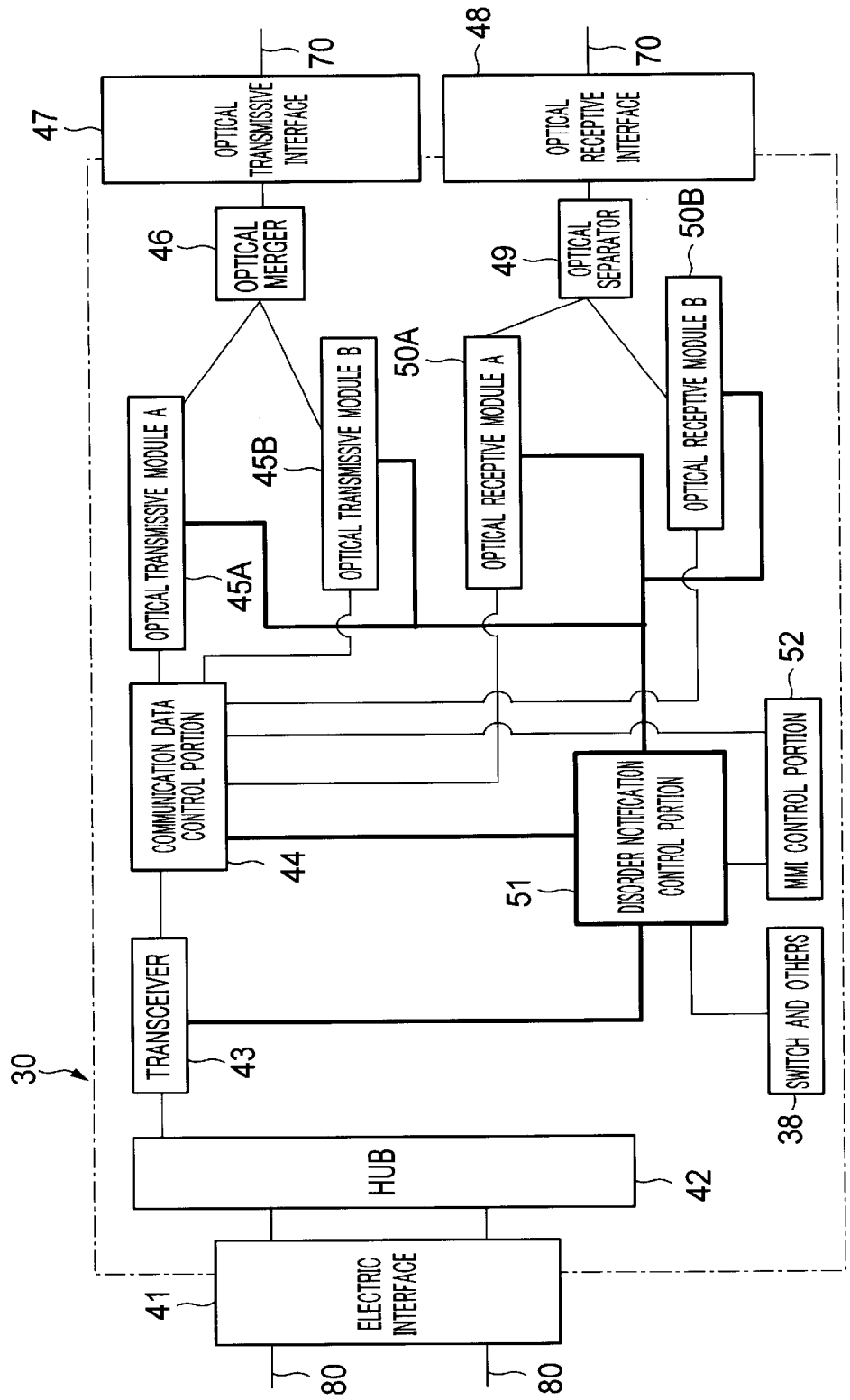
FIG. 3 is a block diagram for illustrating the simplified composition of the components constituting the LAN connector of the present embodiment.

FIG. 3 is a block diagram for illustrating the simplified composition of the components constituting the LAN connector 30.

The LAN connector 30 as depicted in FIG. 3 comprises an electric interface 41 to connect with electric cables 80 and an optical receptive interface 48 and an optical transmissive interface 47 each to connect with a fiber optical cable 70.

The LAN connector 30 is provided with a hub block 42 to receive electric signals from low level equipment through the electric interface 41 via electric cables 80; a transceiver 43 to extract downside-originated communication signals to carry communication data and a downside-originated idle signal to serve as disorder detection data from the electric signals provided by low level equipment; a communication data control portion 44 to apply an ordinary communication processing to the upward communication signal extracted by the transceiver; an optical transmissive module 45A to convert the downside-originated electric signal having received the ordinary processing into a downside-originated optical communication signal by means of light with a wavelength of 1300 nm; an optical merger 46 to merge the optical downside-originated communication signal, and an optical disorder notification signal which has been obtained through the conversion of the electric idle signal by means of another optical transmissive module 45B as will be described later, into a downside-originated optical signal; an optical transmissive interface 47 to transmit the downside-originated optical signal via a fiber optic cable 70; an optical separator 49 to receive an upside-originated optical signal through an optical receptive interface 48 via a fiber optic cable 70 and to separate an optical communication signal and an optical idle signal contained in that signal; an optical receptive module 50B to convert the upside-originated optical idle signal into an electric signal; and an optical receptive module 50A to convert the upside-originated optical communication signal into an upside-originated electric communication signal.

The LAN connector 30 is further provided with a disorder notification control portion 51 which, while detecting a disorder possibly arising in low level equipment based on a downside-originated idle signal extracted by the transceiver 43, and delivering as output a downside disorder notification pattern correspondent with the disorder thus detected, also detects a disorder possibly arising in high level equipment based on an upside-originated idle signal extracted by the optical separator 49 and the optical receptive module 50B, and delivers as output an upside disorder notification pattern correspondent with the disorder thus detected; and a man-machine interface (MMI) control portion 52 through which an external personal computer (PC) can alter as appropriate the operation conditions of the communication data control portion 44 and the disorder notification control portion 51.

Figure 4:
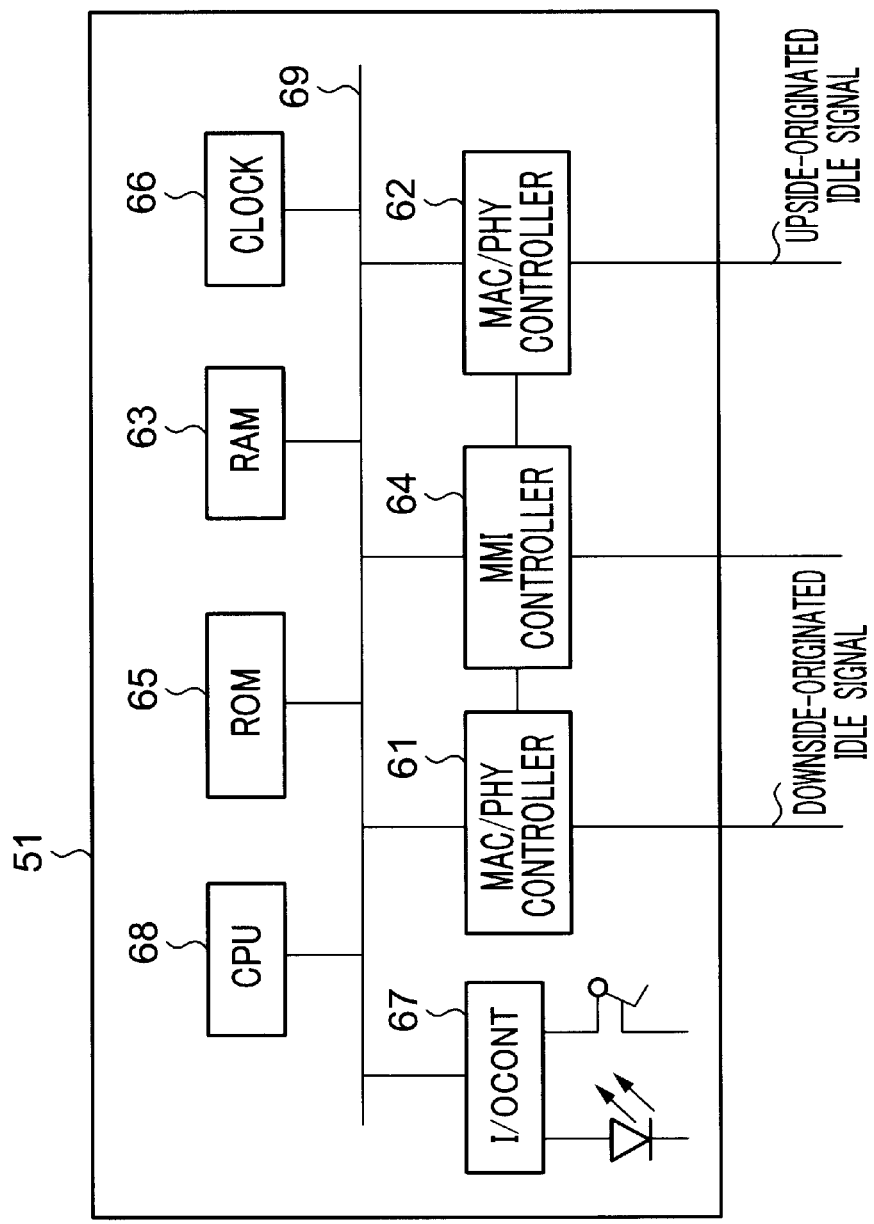
FIG. 4 is a block diagram for illustrating the simplified composition of the elements constituting a disorder notification control portion incorporated in the LAN connector of the present embodiment.

Next, the disorder notification control portion 51 will be described. FIG. 4 is a block diagram for illustrating the simplified composition of the elements constituting the disorder notification control portion 51.

The disorder notification control portion 51 as depicted in FIG. 4 comprises a MAC/PHY controller 61 which checks, with regard to a downside-originated idle signal extracted by the transceiver 43, whether or not the MAC address and frame format information carried by that signal are valid; another MAC/PHY controller 62 which checks, with regard to an upside-originated idle signal obtained as a result of photo-electric conversion by means of the optical receptive module 50B, whether or not the MAC address and frame format information carried by that signal are valid; a RAM 63 which temporarily stores the downside- and upside-originated idle signals after the signals have been judged to be valid by the respective MAC/PHY controllers 61 and 62; an MMI controller 64 to control communication in cooperation with MMI control portion 52; a ROM 65 to store control programs and disorder notification patterns correspondent with different possible disorders; a clock 66 for stamping a time, for example, required for a maintenance work; an I/O controller 67 to control interfaces in order to ensure the smooth entry of commands fed through command keys 38 or the smooth delivery of information to be displayed on LCD 37; a CPU 68 to control the entire disorder notification control portion 51; and an internal BUS to interconnect MAC/PHY controllers 61 and 62, MMI controller 64, RAM 63, ROM 65, time stamping clock 66, I/O controller 67 and CPU 68.

Incidentally, the disorder detecting device as described in the claims is compared to the LAN connector 30; the disorder notifying means to the communication data control portion 44 and disorder notification control portion 51; the monitoring means and the disorder detecting means to the disorder notification control portion 51; the fixed pattern storing means to ROM 65; and the communication line to the fiber optical cable 70.

Figure 5:
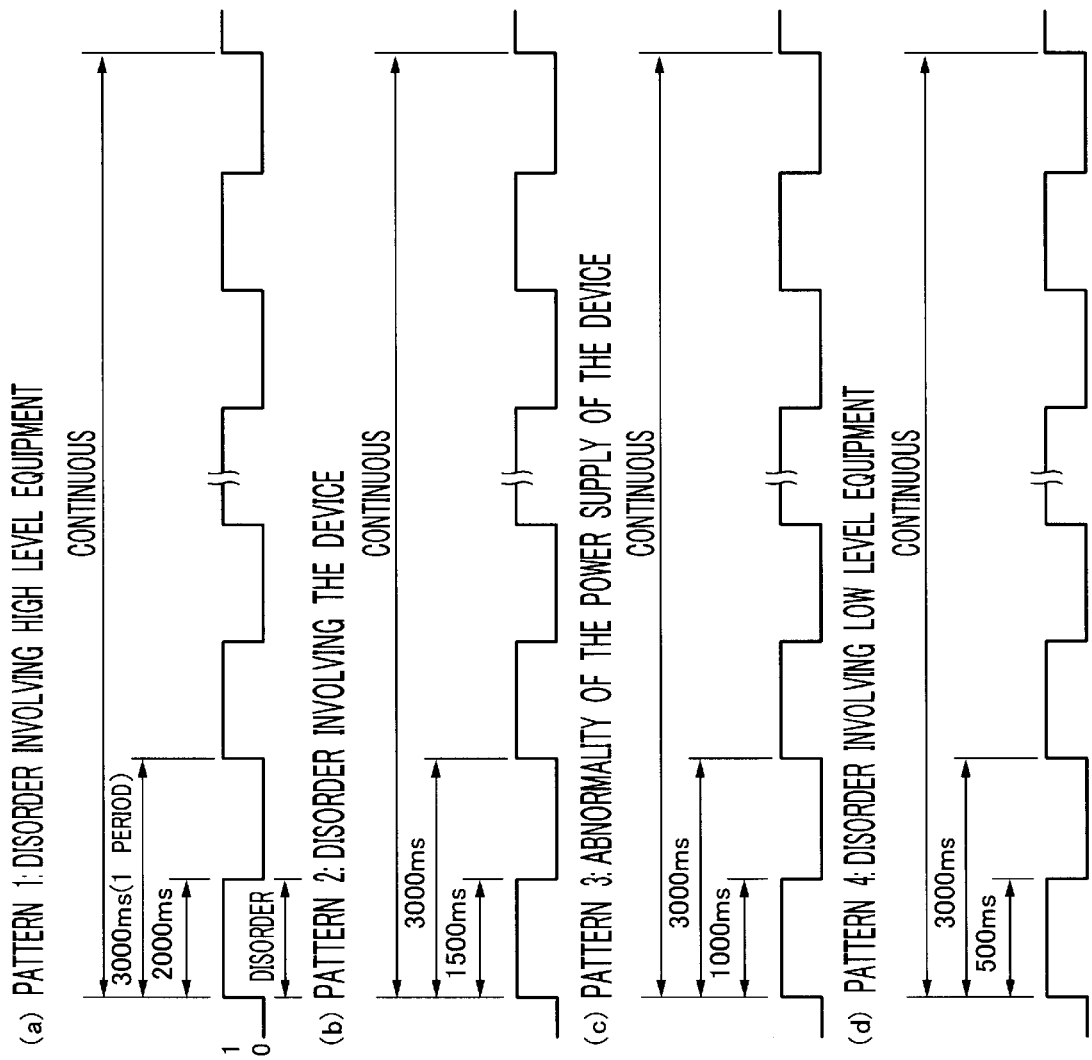
FIG. 5 is a diagram for illustrating an example of the disorder notification patterns of the LAN connector of this embodiment.

The disorder notification pattern stored in ROM 65 is now described. FIG. 5 is a diagram for illustrating an example of the disorder notification patterns. For illustrative purposes, disorder notification will be concerned with the disorders of high level equipment, of a disorder detecting device itself, of the power supply of the disorder detecting device and of low level equipment.

The disorder notification pattern as depicted in FIG. 5(a) is concerned with a disorder involving high level equipment such as a link break or a wire break as indicated by arrow A of FIG. 1 involving the high level equipment 11 or the downward fiber optical cable 70 connecting the high level equipment 11 and the LAN connector 30. The pattern consists of a continuous series of pulse waves each with a period of 3000 msec: each period consists of an initial phase of "1" lasting 2000 msec and a later phase of "0" lasting 1000 msec.

The disorder notification pattern as depicted in FIG. 5(b) is concerned with a disorder involving the disorder detection device itself as indicated by arrow B of FIG. 1, and is used to detect the disorder based on the self diagnosis function of the LAN connector 30. The pattern consists of a continuous series of pulse waves each with a period of 3000 msec: each period consists of an initial phase of "1" lasting 1500 msec and a later phase of "0" lasting 1500 msec.

The disorder notification pattern as depicted in FIG. 5(c) is concerned with a disorder involving the power source of the LAN connector 30 itself such as the outbreak of an abnormal voltage or power failure as indicated by arrow C of FIG. 1, and is responsible for indicating the power source of the disorder detection device itself being abnormal. The pattern consists of a continuous series of pulse waves each with a period of 3000 msec: each period consists of an initial phase of "1" lasting 1000 msec and a later phase of "0" lasting 2000 msec.

The disorder notification pattern as depicted in FIG. 5(d) is concerned with a disorder involving low level equipment such as a link break or a wire break as indicated by arrow D of FIG. 1 involving the low level equipment 21, or the upward electric cable 80 connecting the low level equipment 21 and the LAN connector 30. The pattern consists of a continuous series of pulse waves each with a period of 3000 msec: each period consists of an initial phase of "1" lasting 500 msec and a later phase of "0" lasting 2500 msec.

Next, the operation of the LAN connector 30 constituting a cardinal part of the LAN network system 1 embodying the present invention will be described.

Firstly, description will be given how the LAN connector 30 will receive a downside-originated communication signal contained in a downside-originated electric signal via the electric cable 80.

Transceiver 43 of the LAN connector 30 receives a downside-originated electric signal through electric interface 41 and HUB block 42 via electric cable 80; extracts a downside-originated communication signal from the downside-originated electric signal; and transmits the downside-originated communication signal to the communication data control portion 44.

The communication data control portion 44 applies ordinary communication processing to the downside-originated communication signal, and transmits the downside-originated communication signal thus processed to the optical transmissive module 45A. The communication data control portion 44 may convert a downside-originated communication signal into frame data in some cases.

The optical transmissive module 45A converts the downside-originated communication signal into a downside-originated optical communication signal by means of light with a wavelength of 1300 nm, and transmits the downside-originated optical communication signal to the optical merger 46. The optical merger 46 merges the downside-originated optical communication signal and an optical disorder notification signal from the other transmissive optical module 45B, into a downside-originated optical signal, and transmits the downside-originated optical signal through the transmissive optical interface 47 into the optical fiber cable 70.

Next, description will be given how the LAN connector 30 will receive an upside-originated optical communication signal contained in an upside-originated optical signal via the optical cable 70.

The optical separator 49 of the LAN connector 30 receives an upside-originated optical signal through the optical receptive interface 48 via the optical cable 70; separates an upside-originated optical communication signal and an upside-originated idle signal from that signal; and transmits the upside-originated optical communication signal to the optical receptive module 50A.

The optical receptive module 50A applies photo-electric conversion to the upside-originated optical communication signal to produce an upside-originated communication signal, and transmits the upside-originated communication signal to the communication data control portion 44.

The communication data control portion 44 applies ordinary communication processing to the upside-originated communication signal, and transmits the upside-originated communication signal thus processed to the transceiver 43.

The transceiver 43 transmits the upside-originated communication signal through the HUB block 42 and the electric interface 41, into the electric cable 80.

Next, description will be given how the LAN connector 30 will receive a downside-originated idle signal contained in a downside-originated electric signal via the electric cable 80.

The transceiver 43 of the LAN connector 30 extracts a downside-originated idle signal from a downside-originated electric signal transmitted through the electric interface 41 and the HUB block 42 via the electric cable 80, and transmits the downside-originated idle signal to the disorder notification control portion 51.

The disorder notification control portion 51 can detect a disorder possibly occurring along the electric cable 80 which transmits downside-originated signals from low level equipment to the LAN connector 30, that is, a disorder possibly occurring on the side of low level equipment, by monitoring downside-originated idle signals.

More specifically, as long as the disorder notification control portion 51 receives downside-originated idle signals, it confirms low level equipment functions normally, while if it does not receive an upward idle signal, it learns a disorder may happen on the side of low level equipment.

CPU 68, if a disorder is detected on the side of low level equipment, reads out a disorder notification pattern in correspondence with the disorder, that is, the pattern as indicated by FIG. 5(d), from ROM 65, and transmits the pattern to MAC/PHY controller 61.

The MAC/PHY controller 61 transmits the disorder notification pattern through the communication data control portion 44 to the optical transmissive module 45B.

The optical transmissive module 45B converts the disorder notification pattern to an optical signal, that is, an optical disorder notification signal by means of light with a wavelength different from that of light used for the transmission of downside-originated optical communication signals passed by the other optical transmissive module 45A, and transmits the optical disorder notification signal to the optical merger 46.

The optical merger 46 merges the above-described downside-originated optical communication signal and the optical disorder notification signal into a downside-originated optical signal, and transmits the downside-originated optical signal through the optical transmissive interface 47 into the optical cable 70.

The high level equipment 11 receives the downside-originated optical signal via the optical cable 70, and can learn a disorder may happen along the electric cable 80 which transmits upward signals from low level equipment 21 to the LAN connector 30, based on the optical disorder notification signal contained in the downside-originated optical signal.

Next, description will be given how the LAN connector 30 will receive an upside-originated idle signal contained in an upside-originated optical signal via the optical cable 70.

The optical separator 49 of the LAN connector 30 separates an upside-originated optical communication signal and an upside-originated idle signal from an upside-originated optical signal, and transmits the upside-originated idle signal to the optical receptive module 50B.

The optical receptive module 50B applies photo-electric conversion to the upside-originated idle signal, and transmits the upside-originated idle signal converted in an electric signal through the communication control portion 44 to the disorder notification control portion 51.

The disorder notification control portion 51 can detect a disorder possibly occurring along the optical cable 70 which transmits downward signals from the high level equipment 11 to the LAN connector 30, that is, a disorder possibly occurring on the side of the high level equipment, by monitoring the upside-originated idle signal.

More specifically, as long as the disorder notification control portion 51 receives upside-originated idle signals, it confirms the high level equipment functions normally, while if it does not receive an upside-originated idle signal, it learns a disorder may happen on the side of the high level equipment.

CPU 68, if a disorder is detected on the side of the high level equipment, reads out a disorder notification pattern in correspondence with the disorder, that is, the pattern as indicated by FIG. 5(a), from ROM 65, and transmits the pattern to MAC/PHY controller 61.

The MAC/PHY controller 62 transmits the disorder notification pattern through the communication data control portion 44 to the optical transmissive module 45B.

The optical transmissive module 45B converts the disorder notification pattern to an optical signal, that is, an optical disorder notification signal by means of light with a wavelength different from that of light used for the transmission of downside-originated optical communication signals passed by the other optical transmissive module 45A, and transmits the optical disorder notification signal to the optical merger 46.

The optical merger 46 merges the above-described downside-originated optical communication signal and the optical disorder notification signal into a downside-originated optical signal, and transmits the downside-originated optical signal through the optical transmissive interface 47 into the optical cable 70.

The high level equipment 11 receives the downside-originated optical signal via the optical cable 70, and can learn a disorder may happen along the optical cable 70 which transmits downward signals from the high level equipment 11 to the LAN connector 30, based on the optical disorder notification signal contained in the downside-originated optical signal.

Now, description will be given how the LAN connector 30 performs the self-diagnosis function.

To perform the self-diagnosis function, the LAN connector 30 executes self-diagnosis consisting, for example, of checking instructions by means of CPU 68 of the LAN connector 30, checking ROM 65 and RAM 63, and checking the read/write by means of I/O controller 67.

CPU 68 of the disorder notification control portion 51, when it learns a disorder may happen in its own device as a result of the self-diagnosis, reads out the disorder notification pattern as indicated by FIG. 5(b) in correspondence with the disorder, and transmits the pattern through MAC/PHY controller 61, communication data control portion 44, optical transmissive module 45B, optical merger 46 and optical transmissive interface 47 into the optical cable 70, in order to transmit the disorder notification pattern in question to the high level equipment 11.

The high level equipment 11 receives the downside-originated optical signal via the optical cable 70, and can learn a disorder may arise in the LAN connector 30 based on the optical disorder notification signal contained in the downside-originated optical signal.

Then, description will be given how an abnormality arising in the power supply of the LAN connector 30 will be treated.

CPU 68 of the LAN connector 30 always monitors the voltage states of its components, and, if it detects an abnormality involving power supply such as an abnormal voltage state or power failure, it reads out the disorder notification pattern in correspondence with this disorder as depicted in FIG. 5(c) from ROM 65, and transmits the pattern through MAC/PHY controller 61, communication data control portion 44, optical transmissive module 45B, optical merger 46 and optical transmissive interface 47 into the optical cable 70, in order to transmit the disorder notification pattern in question to the high level equipment 11.

The high level equipment 11 receives the downside-originated optical signal via the optical cable 70, and can learn an abnormality involving the power supply of the LAN connector 30 based on the optical disorder notification signal contained in the downside-originated optical signal.

It should be noted here that if an abnormality involving the power supply of the LAN connector 30 arises, the LAN connector switching power supply to a failure proof power source will transmit the optical disorder notification signal indicative of a power disorder to the high level equipment 11.

According to this embodiment, even if the LAN connector 30 implements only protocols up to the second layer, it can detect a disorder involving a component of the network as well as the LAN connector itself, by monitoring upside-originated or downside-originated idle signals, and thus it can detect a disorder involving a component of the network (disorder involving a message route) being solely dependent on optical cables 70 and electric cables 80, that is, a physical layer or the first layer.

Further, according to this embodiment, disorder notification patterns in correspondence with possible disorders are stored in advance in ROM 65; and if the LAN connector detects a disorder involving, for example, the high level equipment, low level equipment, or its own power supply, it reads out a corresponding disorder notification pattern and transmits the pattern via the optical cable 70 through which data are communicated on the first layer protocol, to the high level equipment 11.

In the above embodiment, even if the LAN connector 30 detects a disorder in its own component or in its own power supply while it is sending a disorder notification signal informing the failure of low level equipment 21, that is, even if the LAN connector detects a disorder in high level equipment while handling a disorder notification signal informing the failure of low level equipment, the latter signal is transmitted to the high level equipment 11 in advance of a signal informing the failure of high level equipment. However, the transmission order of disorder notification signals may be modified according to the position of the involved equipment in the network, to be more specific, priorities may be given to disorders involving the power supply of LAN connector 30, the component of the same connector, and low level equipment in this order. Thus, if the LAN connector 30 detects a disorder involving the high level equipment while it is sending a disorder notification signal informing the failure of low level equipment 21, it may transmit the former signal to the high level equipment in advance of the latter.

Further, according to the above embodiment, the disorder notification control portion 51 recognizes low level equipment (high level equipment) functions normally as long as the same portion receives downside-originated idle signals (upside-originated idle signals), and notes a disorder may happen on the side of low level equipment (high level equipment) whenever it does not receive a downside-originated idle signal (upside-originated idle signal). However, this may be modified as follows: the downside-originated idle signal (upside-originated idle signal) may consist of an electric signal having a "0" (low) level, or a "1" (high) level; and the LAN connector, when it receives downside-originated idle signals (upside-originated idle signals) giving a level of "1," judges low level equipment (high level equipment) functions normally, whereas when it receives a downside-originated idle signal (upside-originated idle signal) giving a level of "0," it judges a disorder involving low level equipment (high level equipment) may arise.

Figure 6:
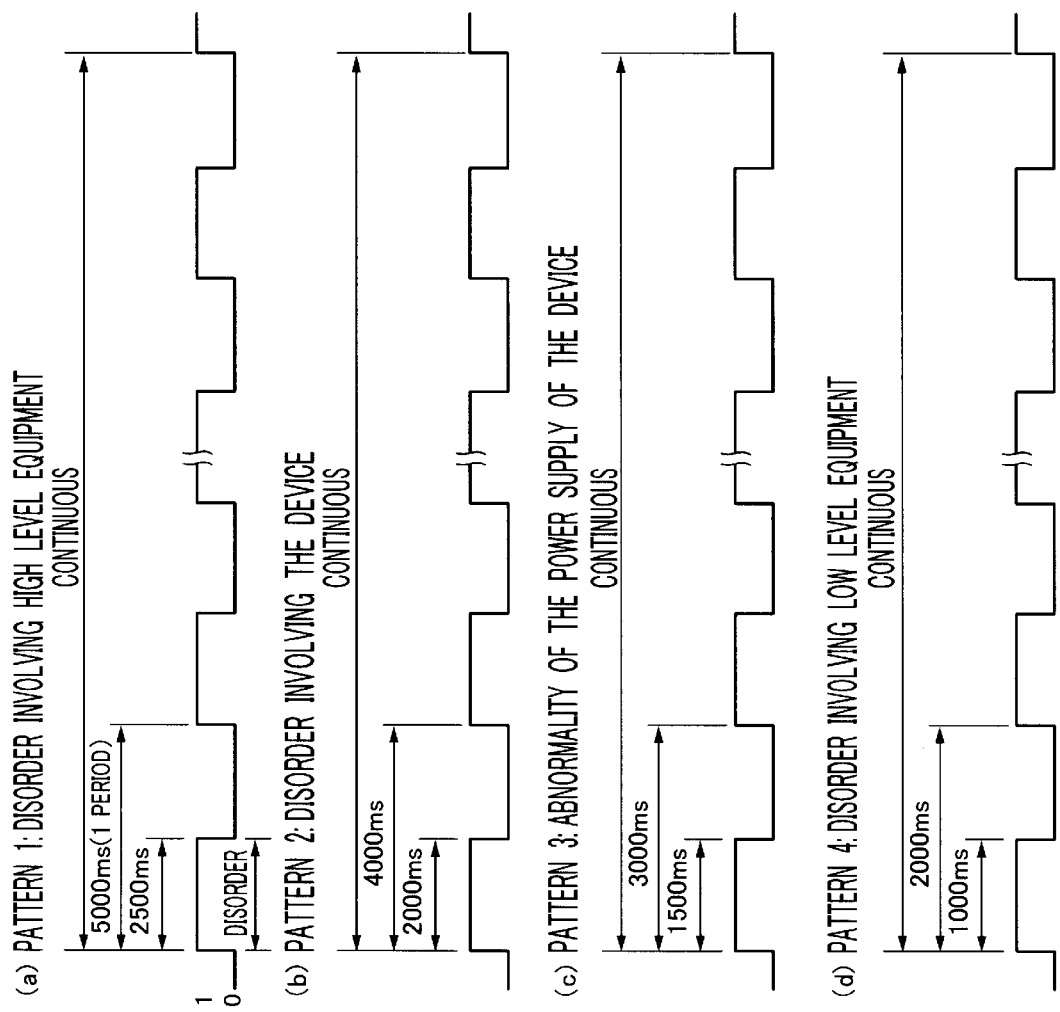
FIG. 6 is a diagram for illustrating another example of the disorder notification patterns of the LAN connector of this embodiment.

Furthermore, according to the above embodiment, the disorder notification patterns as depicted in FIG. 5 are stored in ROM 65. The patterns may be substituted for those as depicted in FIG. 6. In the latter arrangement, when a disorder arises which involves the high level equipment, a series of pulse waves with a period of 5000 msec as depicted in FIG. 6(*a*) may be used; when a disorder arises which involves the LAN connector itself, a series of pulse waves with a period of 4000 msec as depicted in FIG. 6(*b*) may be used; when a disorder arises which involves the power source of the LAN connector 30, a series of pulse waves with a period of 3000 msec as depicted in FIG. 6(*c*) may be used; and when a disorder arises which involves low level equipment, a series of pulse waves with a period of 2000 msec as depicted in FIG. 6(*d*) may be used, as respective disorder notification signals.

Still further, according to the above embodiment, the LAN connector 30 has a function to switch its power supply from a commercial source to a failure proof source or vice versa. However, the LAN connector 30 may be so configured as to store sufficient electricity to work normally for a specified period of time, for example, about one second even if power supply from the commercial source is interrupted, by resorting to, for example, a capacitor or a battery affording a sufficient power supply, instead of a failure proof source, so that a disorder notification signal may be safely delivered. Here one second is introduced as the specified period of time. This is because, if it is assumed that a signal transmits through an Ethernet LAN at a speed of 100 Mbps, it will require only about 12 msec for processing even if it has the largest communication length of 1518 octets permitted to an Ethernet LAN, and leave the remaining time space of about 990 msec for the transmission of a disorder notification signal.

Figure 7:
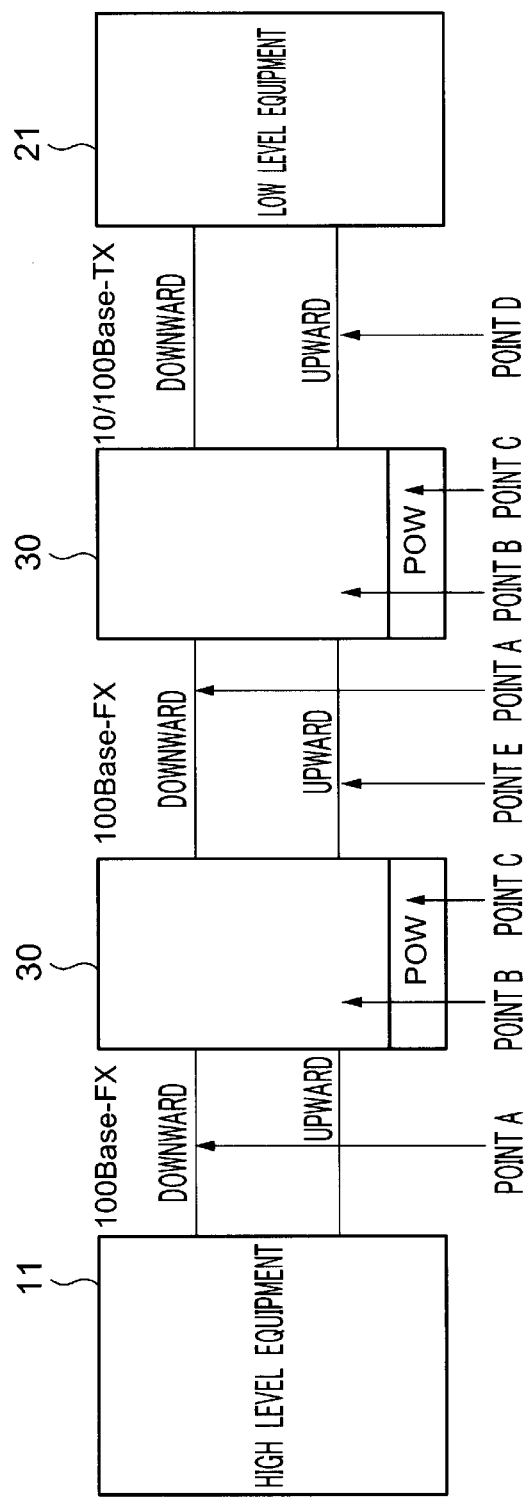
FIG. 7 is a block diagram for illustrating the simplified composition of a LAN network system representing another embodiment.
Figure 8:
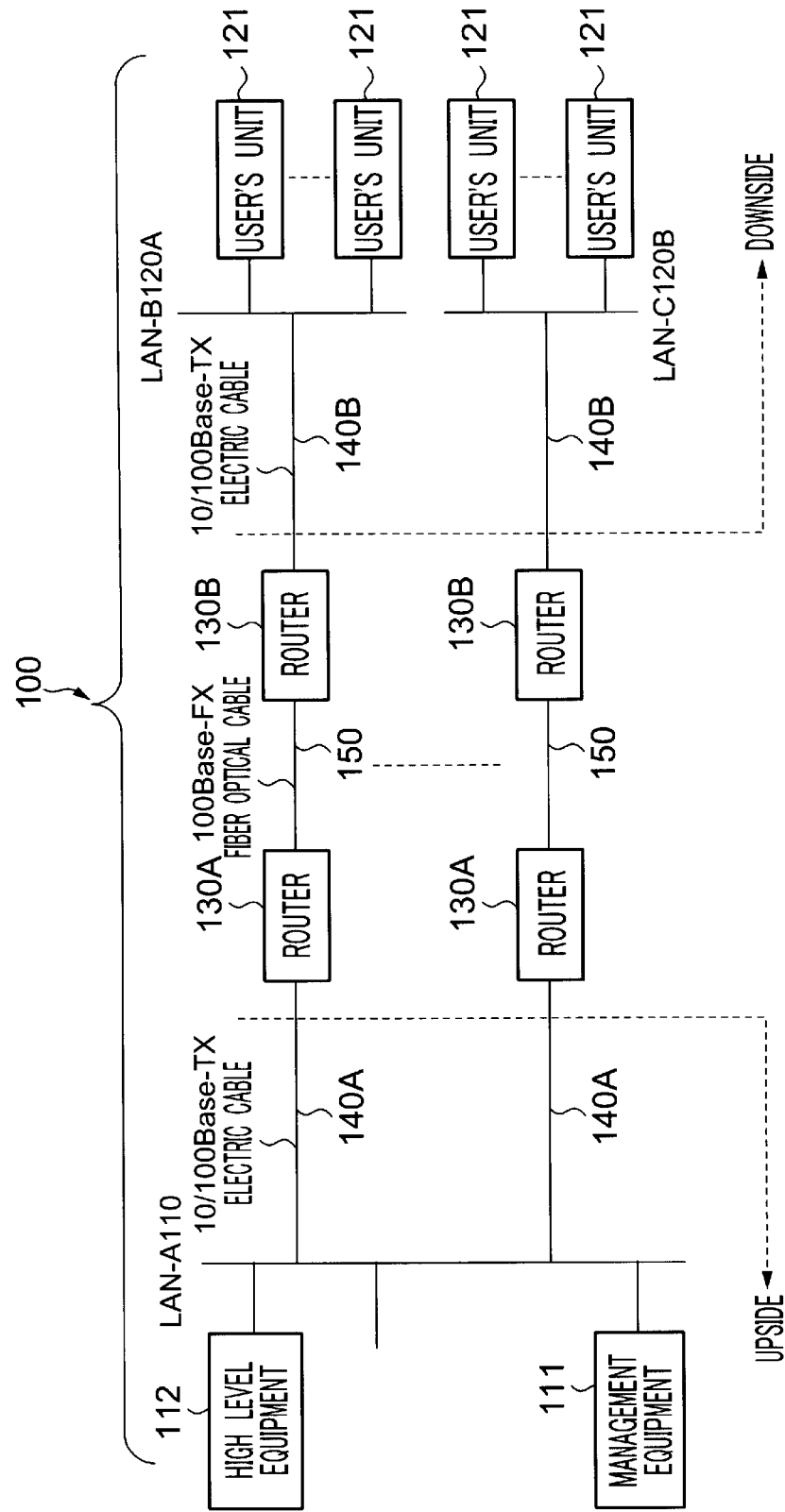
FIG. 8 is a block diagram for illustrating the simplified composition of a LAN network system based on conventional technology.

Still further, according to the above embodiment, the single LAN connector 30 is inserted between the high level equipment 11 and low level equipment 21 as depicted in FIG. 1. However, this may be substituted for a system as depicted in FIG. 7 where a plurality of LAN connectors 30 are inserted between the high level equipment 11 and low level equipment 21. In this case, the LAN connectors 30 can detect disorders involving upward and downward cables connecting the adjacent connectors (points A and E).

Still further, according to the above embodiment, if a disorder arises which involves a cable connecting the high level equipment 11 and the LAN connector 30, an optical signal is transmitted via the optical cable 70; an optical communication signal and an optical disorder notification signal using light having different wavelengths are separated from the optical signal; and the high level equipment 11 is provided with the disorder notification signal to be informed of the disorder. However, the optical communication signal and the optical disorder notification signal may use light having the same wavelength; and the optical module on the side of the high level equipment 11 may be provided with a function to analyze signals so as to identify the disorder notification signal through analysis. This arrangement will reduce cost involved in the maintenance of the LAN connector 30.

Still further, according to the above embodiment, the high level equipment 11 is informed of the nature of a disorder through the signal transmitted via the optical cable 70. However, the signal transmission in question may take place via an electric cable.

The following two options are available when notification of the fixation of a disorder is required. One is not to make any notification even if a disorder is fixed. This is based on the fact that the high level equipment 11 and the LAN connector 30 always monitor the operation state of lines, and can confirm by themselves a disorder has been fixed, by checking the absence of the disorder notification pattern correspondent with the disorder. The other is to transmit a disorder fixation pattern on completion of the fixation of a disorder to inform the high level equipment and the LAN connector of it. The above two options are available to inform high level equipment of the fixation of a disorder.

Even if a LAN implements only protocols for the first layer for OSI, or at maximum for the second layer, as long as it incorporates a disorder detecting device of this invention configured as above, it will be able to detect not only a disorder involving a component of the network, but a disorder involving the device itself, by monitoring upside-originated or downside-originated idle signals, and thus it will be able to detect a disorder involving a component (disorder involving a message route) within the network, by simply resorting to a physical layer or the first layer.

The disorder detecting device of this invention stores, in advance, fixed patterns correspondent with possible disorders; reads out a fixed pattern in correspondence with a disorder detected by a disorder detecting means; and transmits the fixed pattern to high level equipment or low level equipment using a protocol applicable to the first layer. Thus, even if a LAN implements only protocols for the first layer for OSI or at maximum for the second layer, as long as it incorporates a disorder detection device of this invention, it will be able to inform high level equipment or low level equipment of the nature of a disorder involving a component of the network (disorder involving a message route), by only using a physical layer or the first layer.

What is claimed is:

1. A disorder detecting device arranged between high level equipment and low level equipment of a network, to transmit communication data between the high level equipment and the low level equipment in a manner to enable open systems interconnection (OSI), and to implement OSI protocols for the first layer or up to the second layer, comprising:

a monitoring unit to monitor an upside-originated idle signal from the high level equipment and a downside-originated idle signal from the low level equipment using the protocol for the first layer;

a disorder detecting unit to detect not only a disorder involving a component of the network but a disorder involving the disorder detecting device itself, based on the result obtained by the monitoring unit as a result of monitoring the upside-originated idle signal or the downside-originated idle signal; and a disorder notifying unit to notify fixed patterns correspondent with the disorders detected by the disorder detecting unit to the high level equipment or the low level equipment using the protocol for the first layer of the open systems interconnection.

2. The disorder detecting device as described in claim 1 comprising:

a fixed pattern memory unit to store fixed patterns correspondent with contents of disorders possibly involving the components of the network; and wherein the disorder notifying unit reads out a fixed pattern correspondent with a disorder as detected by the disorder detecting unit from the fixed pattern memory.

3. The disorder detecting device as described in claim 2 wherein the disorder notifying unit notifies the fixed pattern using a communication line used for transmitting communication data between the high level equipment and the low level equipment.

4. The disorder detecting device as described in claim 2 wherein the disorder notifying unit notifies the fixed pattern, using a dedicated line different from the communication line used for transmitting communication data between the high level equipment and the low level equipment.

5. The disorder detecting device as described in claim 1 wherein notification of a fixed pattern by the disorder notifying unit to the high level equipment occurs in response to a notification request from the high level equipment.

6. The disorder detecting device as described in claim 1 wherein notification of a fixed pattern by the disorder notifying unit to the high level equipment occurs at specified time intervals.

7. A disorder detecting device arranged between high level equipment and low level equipment of a network, to transmit communication data between the high level equipment and the low level equipment in a manner to enable open systems interconnection (OSI), and to implement OSI protocols for the first layer or up to the second layer, comprising:

a monitoring unit to monitor an upside-originated idle signal from the high level equipment and a downside-originated idle signal from the low level equipment using the protocol for the first layer;

a disorder detecting unit to detect not only a disorder involving a component of the network but a disorder involving the disorder detecting device itself, based on the result obtained by the monitoring unit as a result of monitoring the upside-originated idle signal or the downside-originated idle signal; and a fixed pattern memory unit to store fixed patterns correspondent with contents of disorders possibly involving the components of the network; and wherein the disorder notifying unit which reads out a fixed pattern correspondent with a disorder as detected by the disorder detecting unit from the fixed pattern memory unit, and notifies the fixed pattern to the high level equipment or to the low level equipment using the protocol for the first layer of the open systems interconnection; and wherein the disorder notifying unit notifies the fixed pattern using a dedicated communication wavelength as used in the communication cable for transmitting communication data between the high level equipment and the low level equipment.

8. A disorder detecting device arranged between high level equipment and low level equipment of a network, to transmit communication data between the high level equipment and the low level equipment in a manner to enable open systems interconnection (OSI), and to implement OSI protocols for the first layer or up to the second layer, comprising:

a monitoring unit to monitor an upside-originated idle signal from the high level equipment and a downside-originated idle signal from the low level equipment using the protocol for the first layer;

a disorder detecting unit to detect not only a disorder involving a component of the network but a disorder involving the disorder detecting device itself, based on the result obtained by the monitoring unit as a result of monitoring the upside-originated idle signal or the downside-originated idle signal; and a fixed pattern memory unit to store fixed patterns correspondent with contents of disorders possibly involving the components of the network; and wherein the disorder notifying unit which reads out a fixed pattern correspondent with a disorder as detected by the disorder detecting unit from the fixed pattern memory unit, and notifies the fixed pattern to the high level equipment or to the low level equipment using the protocol for the first layer of the open systems interconnection; and wherein the disorder notifying unit notifies the fixed pattern using a wavelength different from a dedicated communication wavelength used in the communication cable for transmitting communication data between the high level equipment and the low level equipment.

* * * * *